J. A. HEANY.
PROCESS FOR MOLDING.
APPLICATION FILED JUNE 20, 1919.

1,406,730.

Patented Feb. 14, 1922.

INVENTOR
John Allen Heany
BY
Franklin G. Neal
ATTORNEY

UNITED STATES PATENT OFFICE.

JOHN ALLEN HEANY, OF NEW HAVEN, CONNECTICUT.

PROCESS FOR MOLDING.

1,406,730.  Specification of Letters Patent.  Patented Feb. 14, 1922.

Application filed June 20, 1919. Serial No. 305,455.

*To all whom it may concern:*

Be it known that I, JOHN ALLEN HEANY, a citizen of the United States, and a resident of New Haven, in the county of New Haven and State of Connecticut, have invented certain new and useful Improvements in Processes for Molding, of which the following is a specification.

My invention relates to a process for molding, more particularly applicable to the manufacture of relatively small articles of material molded in a plastic state, which are of a delicate nature, which have fine or sharp surface configuration or contour, and which are easily distorted by any change in size, as by relative expansion or contraction of the mold and the article molded, although it is also applicable to general molding practice, as will become apparent.

The objects of the invention are to provide a method of molding of such a character that delicate objects or those having intricate or fine configurations or contours may be molded without distortion or breakage, and to make a mold in which all the configurations can be reproduced and which can be removed from the molded article without breaking or distorting any part thereof.

In copending applications I have disclosed improved luminants for electric lamps, the bases of which are molded from a plastic mass and are formed with very fine threads or spiral grooves in their surfaces, and which, as well as other molded articles, are formed to advantage by the process herein described.

The above objects are attained by forming the mold from metallic material or alloys, preferably those having a low melting point and which are capable of being dissolved in other metals, preferably those which are in a liquid state.

I have found that alloys containing bismuth, cadmium, zinc, lead or tin, in varying proportions such, for example, as Lipowitz metal, are suitable for the mold material although it is not necessary to the invention that the mold be made of an alloy. For use in the particular modification of the process herein illustrated the mold is preferably made from a low-melting metallic material, or one which is easily machined, and capable of being dissolved in another metallic material at ordinary or so-called "room" temperatures. In its broadest aspects, however, the invention contemplates the use of a mold of metallic material capable of being dissolved in another metallic material which may or may not be at a comparatively high temperature in order to exist as a liquid. As an example of a material into which the mold material dissolves at ordinary temperatures, mercury may be cited. In this case the mold may be said to amalgamate with the mercury.

The mold is made in accordance with any approved method, as, for example, by melting the metal and pouring it around the pattern of the device to be molded or by machining the mold to form. In the first instance the metal flows into intimate contact with the pattern and faithfully reproduces every configuration and contour of the surface even of the most minute nature. In machining, the metal cuts easily and cleanly, leaving the surface of the mold smooth and without pits or fractures. The mold is made from a material having a low melting point so that its temperature when in the liquid state need not be excessive. Consequently it flows into all the crevices and corners of the pattern and is thereby subjected to such a slight difference of temperature at its contacting surface that there is no chilling effect. The mold structure is for this reason more perfect.

The material to be molded in a plastic state is packed into the mold by tamping or pressing, for although the configuration of the mold may be very delicate, yet the metal is strong and will resist considerable pressure. The material thus given the required form must be then separated from the mold. It has been found that in removing the mold by melting it away from the molded object even the slight expansion of the low-melting-point metallic material of the mold, due to the slight increase in its temperature required to melt it, is sufficient to fracture the delicate configurations of the surface of the molded object and I therefore remove the mold without changing its temperature at all.

I place the mold, with the molded object within it, in a receptacle containing a metal which dissolves the mold material, such, for example, as mercury, upon which the mold usually floats. The metals of the mold soon dissolve in or amalgamate with the mercury, leaving the molded object floating on the mercury and entirely clean and free from the mold material. The dissolution or amalgamation involves no change in temperature of the materials and consequently there is absolutely no expansion or contraction of either the mold or the molded object, which insures that there is no distortion or fracture of the molded object. The metallic material forming the mold may be separated from the mercury in accordance with any approved method, to be used again in the molding process.

Other features of the invention appear in the following description of a specific embodiment in which the process of molding a threaded base for a luminant or glower for an incandescent lamp is disclosed.

In the following description of the improved process of molding, the article to be molded is cylindrical or rod-like in shape and is, for example, about ⅛ of an inch in diameter and has in its cylindrical surface a very fine thread or helical groove; for example, there may be from 150 to 200 threads to the inch. The material to be molded is metallic oxide, preferably in a plastic state, having a water or other suitable binder. It will be apparent to those skilled in the art that it is impossible to mold such an article with its fine and delicate conformation with ordinary methods of molding. Even methods of molding in which wax is used as a mold material are unsuccessful in this instance because even the low heat required to melt the wax is sufficient to cause expansion or other strains which break away the delicate thread of the weak plastic material. By my improved process I am enabled to mold such an article, perfectly reproducing the exact conformation impressed upon the plastic material by the mold, without injuring or distorting in any way the finest and most delicate configurations of the molded article. In describing in detail the process for molding the base, I do not wish to have it inferred that the process is limited to such an article or those of similar shape, but on the contrary I recite the detailed process merely by way of an example of one application of the process, and, as will be apparent to those skilled in the art, the improved process may be used in the production of articles of various shapes and sizes where the conformations are fine and delicate and the material molded is weak in its plastic condition.

Figure 1:
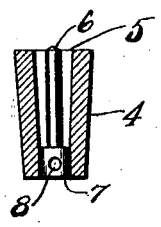
Fig. 1 represents a mold casing in section having a mandrel assembled with it.

To mold the base as described, a mold casing, preferably cylindrical in form, is provided as shown at 4, Fig. 1. The casing is open at each end and is provided with a round aperture 5 slightly larger at the top than at the bottom. Within the aperture is placed the mandrel 6 having the cylindrical or rod-like form of the article to be molded and having its base enlarged as at 7 to fit into the lower end of the casing. An aperture 8 is provided in the base.

Figure 2:
Fig. 2 is an elevation partly in section of the completed mold.

The metal which is to form the mold, such as the alloy or the Lipowitz metal, is melted and poured into the casing, filling it to the top and surrounding the mandrel. It cools and hardens in the casing and on account of the taper shape of the inside of the casing it may be easily removed therefrom, together with the mandrel. The mandrel is easily removed from the mold by inserting a nail or other convenient instrument in the aperture 8 and pulling it out of the mold. The mold is then reamed and tapped to form the completed mold 9 as shown in Fig. 2. The metal described is strong and a very fine thread is cleanly and easily cut or burnished in a mold formed from it. The plastic base material is then forced and packed in the mold, in accordance with any convenient method, as by pressing or by filtration.

Figure 3:
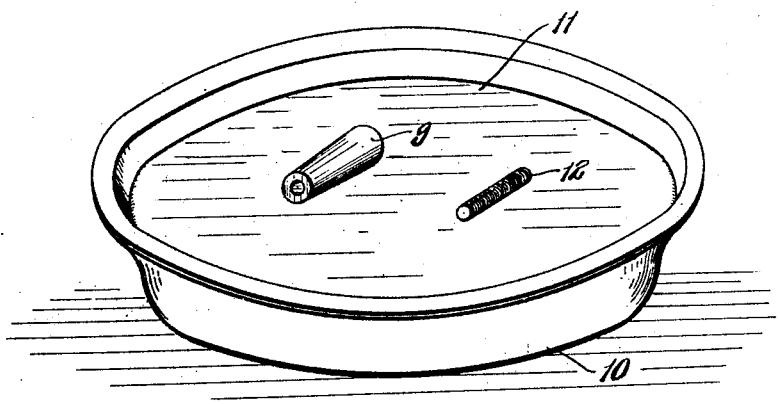
Fig. 3 is a view showing the method of removing the mold from the molded base.

Obviously any other approved method could be utilized to form the mold and to introduce the plastic material into it, and such methods vary with the conditions of molding, such, for example, as the shape of the article molded and the properties of the plastic material to be molded. For example, in a modification of the above-cited process for molding bases, a flat plate of the mold metal having rows of spaced holes molded or drilled in it, is provided and the holes are tapped out, a row at a time, by means of a gang of taps. The plastic material is then forced simultaneously into all the molds of the plate, after which the mold is removed from the molded bases, as described for removing the mold from a single molded base. To remove the mold from its base it is placed in a receptacle 10 containing mercury 11 as shown at 9, Fig. 3. The metal of the mold amalgamates with or dissolves in the mercury and leaves the base floating on the mercury as shown at 12. Thus the base is entirely freed from the mold without being subjected to any strains whatever and is therefore molded without sustaining any fractures or breaks upon removal of the mold. Although I have described as a specific embodiment of my invention the process used to mold small delicate articles of plastic material, the process may also be used to advantage in many other branches of the molding arts. For example, it may be desirable to utilize the process in making metallic castings of large, as well as of small size, where for certain reasons the whole or a part of the mold is of metal, removing the metallic parts by dissolving them in another metal which is maintained in the liquid state, with or without the application of heat.

I claim:—

1. The process of molding which consists in forming the mold of a metallic material capable of being dissolved in other metallic material, inserting the material to be molded into the mold, and removing the mold from the molded object by placing it in the said other metallic material.

2. The process of molding which consists in forming the mold of a substance which will amalgamate with or dissolve in mercury, inserting plastic material therein, and placing the mold in mercury whereby the mold is removed from the plastic material.

3. The step in the process of molding which consists in removing the mold from the molded object by amalgamating or dissolving the mold with mercury.

4. The process of molding which consists in forming the mold from a metallic material which will amalgamate with mercury, filling the mold with the material to be molded and amalgamating the mold with mercury.

JOHN ALLEN HEANY.